United States Patent [19]
Southgate

[11] 3,891,888
[45] June 24, 1975

[54] ROAD VEHICLE LIGHTING SYSTEMS

[75] Inventor: John Peter Southgate, Sutton Coldfield, England

[73] Assignee: The Lucas Electrical Company Ltd., Birmingham, England

[22] Filed: Mar. 25, 1974

[21] Appl. No.: 454,380

[30] Foreign Application Priority Data
May 19, 1973  United Kingdom............... 23963/73

[52] U.S. Cl.............. 315/82; 315/200 R; 315/201; 315/209 R; 315/210
[51] Int. Cl............................................ H01j 29/00
[58] Field of Search....... 315/82, 77, 291, 294, 297, 315/299, 300, 301, 307, DIG. 7, 201, 200 R, 209 R, 210; 307/10 LS; 313/222

[56] References Cited
UNITED STATES PATENTS

| | | |
|---|---|---|
| 3,022,437 | 2/1962 | Cooper............................ 313/222 X |
| 3,319,119 | 5/1967 | Rendina........................... 315/291 X |
| 3,371,241 | 2/1968 | Amacher........................... 315/82 X |

*Primary Examiner*—James B. Mullins
*Attorney, Agent, or Firm*—Waters, Schwartz & Nissen

[57] ABSTRACT

In a road vehicle lighting system with at least one tungsten-halogen lamp, the voltage across the lamp is controlled by a regulator which is independent of the conventional regulator on the vehicle controlling the charging of the battery.

6 Claims, 2 Drawing Figures

ROAD VEHICLE LIGHTING SYSTEMS

FIELD OF INVENTION

This invention relates to road vehicle lighting systems.

SUMMARY OF INVENTION

A road vehicle lighting system according to the invention includes at least one tungsten-halogen lamp, and a regulator in circuit with the lamp for maintaining the voltage across the lamp within the intended operating voltage range of the lamp.

Preferably, the regulator includes a transistor in series with the lamp, and means for switching the transistor on and off to regulate the voltage across the lamp. Preferably, a resistor is connected across the collector-emitter of the transistor. Advantageously, a delay network is incorporated to hold the transistor off for a period when the lamp is first turned on.

In another aspect, the invention resides in a road vehicle electrical system including a generator charging a battery, a voltage regulator controlling charging of the battery, a pair of tungsten-halogen lamps connected across the battery through a lighting switch, and a pair of regulators, one for each lamp, each of said pair of regulators maintaining the voltage across its lamp within the intended operating voltage range of the lamp.

BRIEF DESCRIPTION OF DRAWING

An example of the invention is illustrated in the accompanying drawings, in which.

DETAILED DESCRIPTION

Figure 1:
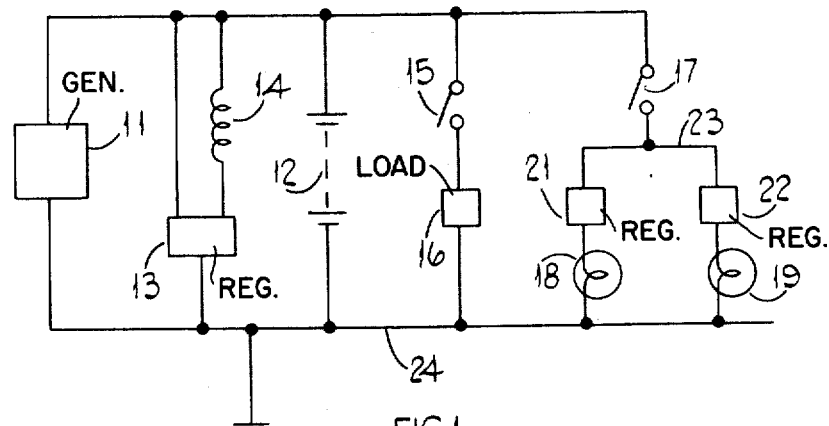
FIG. 1 is a block diagram of an electrical system of a road vehicle.

Referring first to FIG. 1, a generator 11, conveniently an alternator and associated full wave rectifier, charges the battery 12 of a road vehicle. The output of the generator is controlled by a voltage regulator 13 which senses the output voltage and controls the current flow in the field winding 14 of the generator.

The battery 12 provides power through the ignition switch 15 of the vehicle to the ignition controlled loads 16, and there is further provided a lighting switch 17 which controls the flow of current to a pair of tungsten-halogen lamps 18, 19 constituting the headlamps of the vehicle. Moreover, a pair of regulators 21, 22 are provided in series with the lamps 18 and 19 respectively. The regulators 21, 22 control the mean square voltages across the lamps 18 and 19 respectively, and maintain the voltages within the intended operating voltage range of the lamps.

It has been found that tungsten-halogen lamps have their life shortened substantially if they are operated with voltages either below or above the intended operating voltage range. It is believed that this is because departures from the intended range result in changes from the intended filament temperatures. In a vehicle with a nominal 12 volt supply, the voltage may actually vary between, at worst, about 11 volts and 15 volts, that is to say a variation of the order of 30%. In other words, the main voltage regulator 13 is not sufficient to keep the lamp voltages within the desired limits, but rating each lamp at, say, 10 volts, and using a separate regulator for each lamp overcomes this problem.

Figure 2:
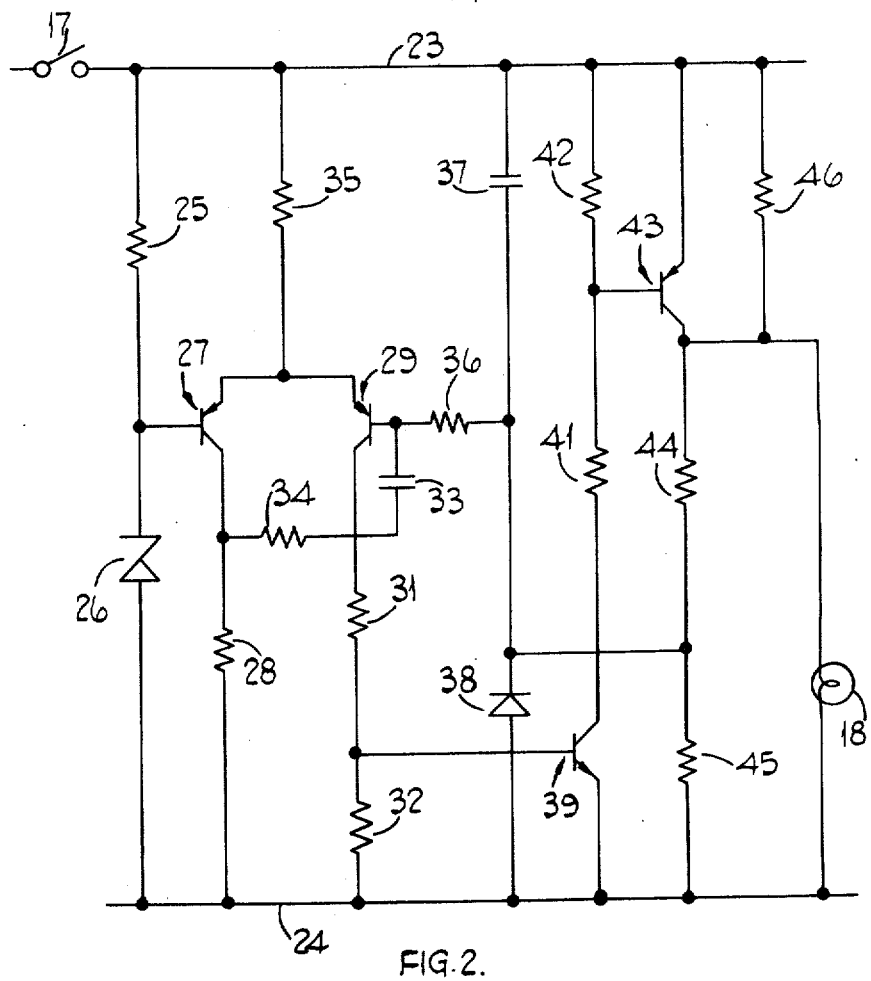
FIG. 2 illustrates the preferred form of the regulator for each of the lamps shown in FIG. 1.

The preferred form of one of the regulators is shown in FIG. 2. The switch 17 provides power to a positive line 23, and connected in series between the line 23 and the ground line 24 are a resistor 25 and a Zener diode 26, the junction of the resistor 25 and Zener diode 26 being connected to the base of a p-n-p transistor 27 and its collector being connected to the line 24 through a resistor 28. There is further provided a p-n-p transistor 29 having its collector connected to the line 24 through a pair of resistors 31, 32 in series and its base connected to the collector of the transistor 27 through a capacitor 33 and a resistor 34 in series. The emitters of the transistor 27, 29 are connected through a resistor 35 to the line 23, and the base of the transistor 29 is connected through a resistor 36 to the junction of a capacitor 37 and a diode 38 connected in series between the lines 23, 24. Moreover, the junction of the resistors 31, 32 is connected to the base of an n-p-n transistor 39, the emitter of which is connected to the line 24 and the collector of which is connected through resistors 41, 42 in series to the line 23. The junction of the resistors 42, 41 is connected to the base of a p-n-p transistor 43 having its emitter connected to the line 23 and its collector connected through a pair of resistors 44, 45 to the line 24. The junction of the resistors 44, 45 is connected to the junction of the capacitor 37 and diode 38, and the collector of transistor 43 is connected to the line 24 through the lamp 18. A resistor 46 is connected across the emitter-collector of the transistor 43.

In order to understand the operation of the circuit it will be assumed that the switch 17 has been closed for a sufficient period of time for the lamp 18 to become warm, so that the initial cold resistance of the lamp 18 can be neglected. In these circumstances, the transistor 43 is being switched on and off to maintain a mean voltage across the lamp 18 producing the required current through the lamp 18. This output voltage wave form is a small rectangular wave form superimposed on a large d.c. level, and it can be shown that for such a wave form the mean and root-mean-square voltage values are nearly the same, and so the required power dissipation and filament temperature is maintained. The output at the collector of the transistor 43 will be of this rectangular wave form, and a proportion of this output appears at the junction of the resistors 44,45 and is smoothed by the diode 38 and the capacitor 37, so that the voltage across the capacitor 37 represents the mean voltage applied to the lamp 18. This voltage is applied to the base of the transistor 29 and compared with the voltage at the base of the transistor 27, which of course is set by the Zener diode 26. The differential amplifier constituted by the transistors 27, 29 and their associated components, including the feedback circuit 33, 34, (which insures that the transistors 39 and 43 are always either on or off) serves when the voltage across the capacitor 37 is lower than the voltage set by the Zener diode 26 to provide base current to the transistor 39, which amplifies this current and turns on the transistor 43. As the supply voltage increases, a point is reached at which the transistor 29 turns off and the transistor 27 turns on, so that the transistor 39 is turned off and no longer provides base current to the transistor 43. The lamp current is then maintained by the resistor 46.

If desired, the component values can be selected so that the lamp voltage varies with battery voltage in a predetermined manner. This can be an advantage with some forms of lamp.

Considering now the situation when the switch 17 is first closed, the lamp will of course be cold at this time, and it is advantageous to hold the transistor 43 off for a predetermined period of time while the lamp 18 warms up. The circuit shown achieves this by virtue of the capacitor 37, which while the switch 17 is off will have been discharged by way of the diode 38. When the switch 17 is closed, the capacitor 37 charges through the resistor 45, and through the parallel path by way of the resistor 44 and lamp 18, and until capacitor 37 has charged the transistors 29, 39, 43 will be off.

I claim:

1. A road vehicle lighting system including at least one tungsten-halogen lamp having a rated operating voltage range and a regulator connected with the lamp for maintaining the voltage across the lamp within said operating voltage range of the lamp, said regulator including a transistor in series with the lamp, said transistor including a base, collector and emitter, and means for switching the transistor on and off to regulate the voltage across the lamp, and a resistor connected across the collector-emitter of the transistor.

2. A system as claimed in claim 1 comprising a delay network responsive to an initial application of voltage to said lamp coupled to and holding the transistor off for a determinable period when the lamp is first turned on, whereby current flows to the lamp through said resistor.

3. A system as claimed in claim 1 wherein said regulator comprises a Zener diode, a source of voltage, a first resistor connecting said diode to said source, a first transistor coupled to said diode, a second transistor coupled to said first transistor, a first capacitor coupling said second transistor and capacitor to ground, a further diode coupling said second transistor and capacitor to ground, a third transistor coupled between said source, second transistor and ground, and a fourth transistor coupled between said source, third transistor and associated lamp.

4. A road vehicle electrical system including a generator charging a battery, a voltage regulator coupled to and controlling charging of the battery, a lighting switch, a pair of tungsten-halogen lamps having a rated operating voltage range, connected across the battery through said lighting switch, and a pair of regulators respectively connected to one said lamp, each of said pair of regulators maintaining the voltage across its respective lamp within said operating voltage range of the lamp, each latter said regulator including a transistor in series with the lamp said transistor including a base, collector and emitter, and means for switching the transistor on and off to regulate the voltage across the lamp and a resistor connected across the collector-emitter of the transistor.

5. A system as claimed in claim 4 comprising a delay network responsive to an initial application of voltage to said lamps coupled to and holding each said transistor off for a determinable period when the associated lamp is first turned on.

6. A system as claimed in claim 4 wherein each said regulator comprises a Zener diode, a source of voltage, a first resistor connecting said diode to said source, a first transistor coupled to said diode, a second transistor compled to said first transistor, a first capacitor coupling said second transistor and capacitor to ground, a third transistor coupled between said source, second transistor and ground, and a fourth transistor coupled between and source, third transistor and associated lamp.

* * * * *